July 26, 1966  A. J. FROEHLER  3,262,510
AIR CUSHION VEHICLE WITH LIFT, TURN, AND BRAKE CONTROLS
Filed June 4, 1962  3 Sheets-Sheet 1
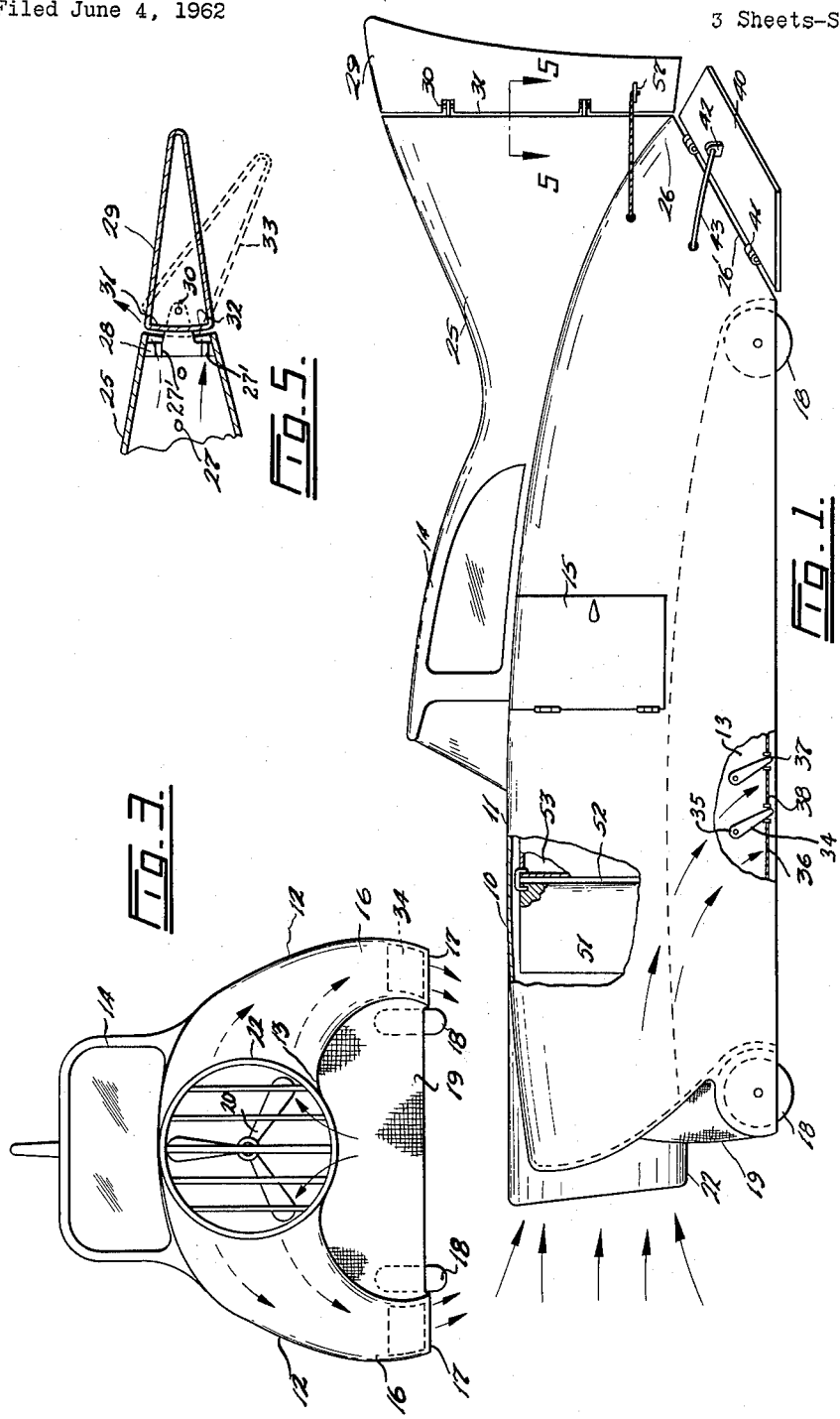
INVENTOR:
ALPHONS J. FROEHLER July 26, 1966
A. J. FROEHLER
3,262,510
AIR CUSHION VEHICLE WITH LIFT, TURN, AND BRAKE CONTROLS
Filed June 4, 1962
3 Sheets-Sheet 2
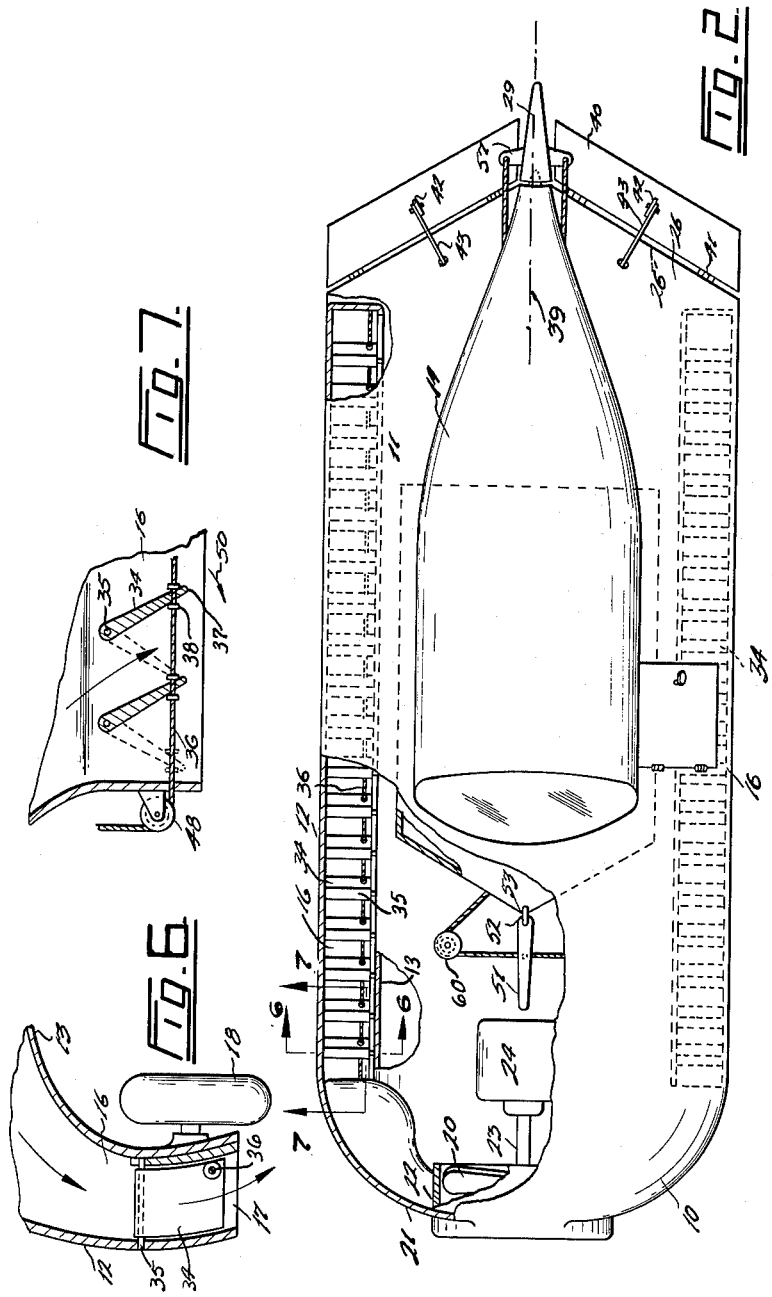
INVENTOR
ALPHONS J FROEHLER

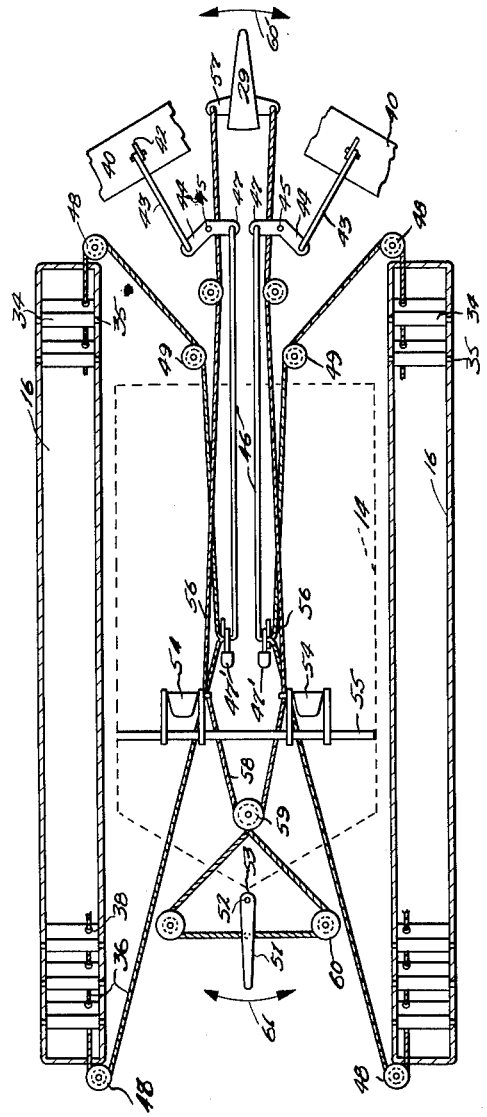

United States Patent Office 3,262,510
Patented July 26, 1966

3,262,510
AIR CUSHION VEHICLE WITH LIFT, TURN, AND BRAKE CONTROLS
Alphons J. Froehler, 12 Westwood Drive, Calgary, Alberta, Canada
Filed June 4, 1962, Ser. No. 199,933
3 Claims. (Cl. 180—7)

My invention relates to new and useful improvements in combination wheel vehicles and air cushion vehicles.

Ducted fan type of air cushion vehicles suffer principally from the lack of control both in control of direction and in control of forward movement or braking.

The principal object and essence of my invention is to provide a ducted fan air cushion vehicle in which the pressurized air is routed to elongated ports opening upon the underside of each side of the vehicle, said ports having a plurality of airfoil control louvres mounted therein which not only control the amount of lift, but also assist in turning and in braking.

Another object of my invention is to provide a device of the character herewithin described which includes novel combination elevators and ailerons once again assisting in the maneuverability of the vehicle.

A still further object of my invention is to provide a device of the character herewithin described which includes a rudder control surface further assisted by the escape of pressurized air from the rear of the body shell thereby assisting in the maneuverability of the vehicle at relatively low speeds.

A still further object of my invention is to provide a device of the character herewithin described in which the various control surfaces are operated simply by foot pedals and control sticks in a cockpit, the inter-connection of the various control surfaces to these control means giving a wide variety of maneuverability controls.

A still further object of my invention is to provide a device of the character herewithin described which operates efficiently with a relatively small powered engine which, due to the relatively streamlined configuration of the body shell, is capable of relatively high forward speeds.

A yet further object of my invention is to provide a device of the character herewithin described which is relatively simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a side elevation of my device partially sectioned to show the interior thereof.

FIGURE 2 is a top plan view of FIGURE 1, also partially sectioned to show the interior thereof.

FIGURE 3 is a front elevation of my device.

FIGURE 4 is a top plan sectional view showing specifically the control lay-out.

FIGURE 5 is an enlarged fragmentary plan sectional view of the rudder attachment to the rear of the body.

FIGURE 6 is an enlarged fragmentary sectional view along the lines 6—6 of FIGURE 2.

FIGURE 7 is a fragmentary view along the lines 7—7 of FIGURE 2.

In the drawings like characters of reference indicate corresponding parts in the different figures.

Proceeding therefore to describe my invention in detail, reference should be made to the accompanying drawings in which reference character 10 generally designates the elongated body shell which is shown in the attached drawings as being of one piece construction having an upper deck 11, downwardly curving sides 12 and a recessed base 13. However, it will be appreciated that it may be desirable to add conventional stiffening members within the body shell, but these have been deleted firstly because such bracing is well known in the art, and secondly for the purpose of clarity.

The hollow body shell is preferably of a generally streamlined construction and fitted within the top deck 11 of the shell and extending downwardly to the base or floor 13 is a cockpit area collectively designated 14 with an entrance door 15 on one side of the body shell.

The configuration of the hollow body shell takes the form of a substantially inverted elongated hollow U and the side legs or tunnels 16 of the U take the form of elongated air cushion ports being open upon the underside or base 17 thereof and communicating with the hollow interior of the body shell.

Ground engaging wheels 18 are secured for rotation at the four corners of the body and inboard of the legs 16 and a flexible covering 19 extends across the front of the legs or ports as clearly shown in FIGURE 3.

A ducted fan 20 is journalled for rotation adjacent the front end 21 of the shell, cylindrical duct 22 surrounding the fan as clearly illustrated and this fan is connected by means of a drive shaft 23 to a source of power 24 which preferably takes the form of an air-cooled motor.

A stationary fin 25 is situated upon the upper surface 11 of the body shell and is preferably blended in with the cockpit 14 as clearly shown in FIGURE 1. This fin terminates adjacent the rear 26 of the body shell and the fin is preferably hollow as shown in FIGURE 5 and communicates with the hollow body shell via a series of apertures 27 formed through the upper surface 11 of the body shell below the fin 25. The rear of the hollow fin is vented as at 27' to atmosphere and also carries a stern post 28 upon which is journalled for sideways movement, a rudder fin 29 by means of pivots 30 and it will be noted that these pivots are situated inboard of the forward edge 31 of the fin.

When the fin is in the neutral position as shown in full line in FIGURE 5, the front or leading edge 31 of the fin closes off the open rear end of the stationary fin 25, but when the rudder fin is moved so that it takes up the position shown for example, in phantom in FIGURE 5, air is permitted to escape and strikes the inboard surface 32 of the rudder fin thus acting as a server mechanism to assist in the movement of the rudder fin. Also air strikes the surface 33 of the rudder fin and as this air is under pressure, it assists in the action of the rudder at particularly relatively low speeds.

However, the air escaping through the rear of fin 25 is relatively small in quantity as the majority of the air drawn in by the ducted fan 20 is forced to exit through the elongated air cushion ports 16 thus striking the ground immediately below the vehicle and forming the air cushion which raises the vehicle clear of the ground surface.

The action of this air is assisted by the provision of a plurality of airfoil louvres 34 pivoted transversely along the length of the ports 16 by means of pivot pins 35 and these louvres are in spaced and parallel relationship along the entire length of ports 16.

Means are provided to adjust the position of the louvres 34 and in this embodiment takes the form of a cable 36 extending longitudinally through the ports 16 and through the lower ends 37 of the louvres, cable stops 38 being provided upon each side of each louvre 34 thus anchoring the louvres to the cables so that movement of the cable backwardly and forwardly through the ports, moves all of the louvres by the same amount and in the same directions.

When viewed in plan, the rear end 26 of the body shell extends or inclines forwardly at an angle from the center line 39 and pivotally attached to these inclined rear edges 26' is a pair of combination elevator and aileron control surfaces 40, being pivotally secured to the edges 26' by means of pivots 41. By angling or inclining these control surfaces as clearly shown, a combination elevator and aileron control of the vehicle is established.

Turning next to FIGURE 4, the control mechanism for the louvres 34 and the combination elevators and ailerons 40 will be described.

Crank arms 42 extend upwardly from the control surfaces 40 and links 43 are pivotally secured by one end thereof to these crank arms 42 and extend inwardly through the body shell to be connected to bell cranks 44 pivoting on pins 45. Control rods 46 extend from the opposite ends 47 of the bell cranks forwardly to a pair of control sticks 47' pivoted by the lower ends thereof to the cockpit floor. It will be seen that the combination elevator and aileron 40 are each controlled independently by the control sticks 47' so that rearward movement of either of the control sticks 47' causes the control surfaces 40 to elevate in much the same way as the conventional elevator, on an aircraft. However, due to the aforementioned inclination forwardly of the control surfaces, and due to the independent possibilities of actuation by the two control sticks 47', a combination elevator and aileron control is obtained.

Also connected to each of the control sticks 47' is the aforementioned cable 36 secured to the louvres 34 and being in the form of an endless cable routed around pulleys 48 at each end of the port 16 and further guide pulleys 49 as necessary. The connection and routing of the cables 36 is such that when the control sticks 47' are moved rearwardly, the louvres 34 move in the direction of arrow 50 shown in FIGURE 7.

Situated within the body shell rearwardly of the engine 24 is a further vertically situated control surface designated as a metering control 51 and this is pivoted by means of vertical spindle 52 just forwardly of the front end 53 of the cockpit, but within the airstream entering the body shell due to the ducted fan 20.

A pair of rudder pedals 54 are mounted for pivotal movement upon a transverse shaft 55 within the cockpit 14 and cables 56 extend from the rudder pedals rearwardly to the transverse operated bar 57 of the rudder fin 29. Extensions 58 of these cables 56 extend forwardly over a double pulley 59 whereupon they cross and extend around a pair of pulleys 60 situated each side of the aforementioned metering control 51, the cable being secured to the metering control forwardly of the pivot pin 52.

In operation of this portion of the control system, operation of either of the rudder pedals 54 will cause the rudder to move in the direction of the double-headed arrow 60' and will also cause the metering control surface 51 to move in the direction of arrows 61, both the metering control surface 51 and the rudder fin 29 moving in the same direction or toward one another when the rudder pedals are operated. This metering fin proportionally directs the air entering the hollow body shell towards one side or the other of the body shell thus increasing or decreasing the amount of air passing out of the ports 16.

In operation, and assuming at the commencement, that all controls are centralized or neutral, the engine 24 rotates the fan 20 which is provided with blades having an angle of attack adapted to draw air through the cylindrical duct 22 into the interior of the body shell. This air passes downwardly through the ports 16 and, with the louvres 34 situated substantially vertically, the air cushion is generated thus raising the vehicle clear of the ground. The louvres are then inclined rearwardly slightly as shown in FIGURE 1 by means of the control sticks, thus deflecting the air slightly rearwardly and causing forward motion to occur yet at the same time maintaining the air cushion effect. The rudder fin 29 is utilized to maintain the vehicle on a straight course, but if it is desired to turn, the rudder pedals are operated thus changing the position of the rudder fin 29 and the metering control surface 51. The operation of the rudder fin causes a relatively flat turning effect to occur and by changing the proportion of air passing through the relevant port 16, makes slight banking effect or turning assistance is obtained.

However, if banking of further elevation is desired, then the control sticks 47' are utilized which operate the combination elevator and aileron controls and also the airfoil louvres 34, decreasing the lift on the inner side of the turn and increasing it through the port on the outside of the turn.

Also to be observed, when a reasonable forward speed is obtained there is a certain ram effect of the fan intake which assist in the sensitivity and efficiency of the control systems.

Finally it should be noted that as the forward speed of the vehicle increases the flexible curtain 19 is deflected rearwardly by ram air or sledding effect and at designed cruising speed this ram air pressure will exceed engine and fan produced air cushion pressure, thus forcing the flexible curtain 19 to fold back and lay up to the base or floor 13. Thus at cruising speeds, three lift effects are maintaining the vehicle off the ground.

(1) Ram air or sledding effect as described above.
(2) Cushion air as supplied by engine or engines 34 and ducted fan or fans 20.
(3) Aero dynamic lift by virtue of the overall aero dynamic shape of the inverted "U" body and the area of the low pressure air induced above the vehicle.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In an air cushion vehicle, the combination of an enclosed substantially hollow body shell, a cockpit formed in said body shell, at least one ducted fan mounted for rotation in the vertical plane at the front end of said body shell, a source of power in said body shell operatively connected to said ducted fan, an elongated air cushion port along each side of said body shell opening upon the underside thereof and communicating with said ducted fan, a plurality of spaced and parallel airfoil control louvres pivotally mounted in spaced and parallel relationship in each of said ports, combination elevator and aileron means pivotally mounted at the rear of said body shell rudder means pivotally mounted to said body shell adjacent the rear thereof in the vertical plane, foot control means in said cockpit operatively connected to said rudder means, and hand control means in said cockpit operatively connected to both said airfoil control louvres and said combination elevator and aileron means, vertically extending air deflector means pivotally mounted about a vertical axis in board of said ducted fan and adapted to divert proportionately air to each of said elongated air cushion ports, and means operatively connecting said air deflector means to said foot control means pivoting said rudder and said air deflector means towards each other and towards the same side of the vehicle upon operation of said foot control means.

2. The device according to claim 1 in which said rudder means comprises a vertically mounted control surface pivotally connected about a vertical axis to the rear of said body shell, said pivotal mounting being inboard of the front edge of said control surface, air vents in the rear of said body shell in line with said vertically situated rudder means, said air vents normally being inoperative when said rudder control surface is in the neutral position, said air vents directing air upon the portion of said rudder control surface forwardly of said pivotal mounting when said rudder control surface is moved off center.

3. The device according to claim 1 in whic hsaid airfoil louvres are pivotally mounted by the upper ends thereof to adjacent the upper side of said elongated air cushion ports, cable means extending along the length of said ports, each of said louvres being operatively connected adjacent the lower end of said louvres to said cable means whereby movement of said cable means forwardly and rearwardly within said port, moves all of said louvres in said port in the same direction and by the same amount.

References Cited by the Examiner

UNITED STATES PATENTS

| | | |
|---|---|---|
| 2,387,627 | 10/1945 | Warner. |
| 2,461,435 | 2/1949 | Neumann et al. |
| 2,484,359 | 10/1949 | Tipton _____ 244—87 |
| 2,567,392 | 9/1951 | Naught. |
| 2,736,514 | 2/1956 | Ross. |
| 2,838,257 | 6/1958 | Wibault. |
| 3,039,550 | 6/1962 | Beardsley _____ 180—7 |
| 3,088,536 | 5/1963 | Chezem _____ 180—7 |
| 3,090,455 | 5/1963 | Crowley _____ 180—7 |
| 3,127,949 | 4/1964 | Harter _____ 180—7 |
| 3,191,705 | 6/1965 | Jones et al. _____ 180—7 |

FOREIGN PATENTS

| | | |
|---|---|---|
| 219,133 | 1/1959 | Australia. |
| 1,263,704 | 5/1961 | France. |

A HARRY LEVY, *Primary Examiner*.